(12) United States Patent
Bammer et al.

(10) Patent No.: US 9,170,085 B2
(45) Date of Patent: Oct. 27, 2015

(54) DEVICE FOR DETECTING THE POSITION OF AN ACTUATOR

(75) Inventors: Manfred Bammer, Vienna (AT); Gernot Schmid, Bromberg (AT)

(73) Assignees: AIT Austrian Institute of Technology GmbH, Vienna (AT); Seibersdorf Labor GmbH, Seibersdorf (AT)

( * ) Notice: Subject to any disclaimer, the term of this patent is extended or adjusted under 35 U.S.C. 154(b) by 548 days.

(21) Appl. No.: 13/638,752

(22) PCT Filed: Mar. 28, 2011

(86) PCT No.: PCT/AT2011/000154
§ 371 (c)(1),
(2), (4) Date: Oct. 23, 2012

(87) PCT Pub. No.: WO2011/120064
PCT Pub. Date: Oct. 6, 2011

(65) Prior Publication Data
US 2013/0106405 A1    May 2, 2013

(30) Foreign Application Priority Data
Mar. 29, 2010   (AT) .................................. A 504/2010

(51) Int. Cl.
*G01B 7/14*    (2006.01)
*G01D 5/14*    (2006.01)

(52) U.S. Cl.
CPC . *G01B 7/14* (2013.01); *G01D 5/145* (2013.01)

(58) Field of Classification Search
CPC ... G01D 5/2053; G01D 5/2046; G01D 5/145; G01D 5/2073; G01D 5/2086; G01D 5/202; G01B 3/205; G01B 7/003; G01B 7/02; F01L 9/04; F01L 2009/0405; F01L 2009/0469; G01R 31/06; G07C 1/24

USPC ............ 324/207.11, 207.13, 207.15, 207.16, 324/207.22; 336/45, 232
See application file for complete search history.

(56) References Cited

U.S. PATENT DOCUMENTS 3,795,907 A * 3/1974 Edwards .................. 340/323 R
5,055,814 A * 10/1991 Morimura et al. ............ 336/119
(Continued)

FOREIGN PATENT DOCUMENTS

DE    3913861 A1    11/1989
DE    38 21 764 A1   1/1990
(Continued)

OTHER PUBLICATIONS

Maridor et al., Sensorless position detection of a linear actuator using the resonance frequency, Electrical Machines and Systems, 2009. ICEMS 2009. International Conference.*
(Continued)

*Primary Examiner* — Patrick Assouad
*Assistant Examiner* — Sean Curtis
(74) *Attorney, Agent, or Firm* — Laurence A. Greenberg; Werner H. Stemer; Ralph E. Locher

(57) ABSTRACT

A device for detecting the position of an actuator has a conductor arrangement, which detects magnetic fluxes flowing therethrough and converts same into a voltage signal that is dependent on the position, at which the magnetic flux penetrates the conductor arrangement. The induced voltage signal is proportional to the position of the magnetic flux, measured along a predetermined axis starting from a predetermined starting point. A position-determining unit is connected to the conductor arrangement for determining the position of a magnetic flux generated by the actuator and passing though the conductor arrangement. A transmission unit, by way of which the determined position is transmitted to a receiver, is arranged downstream of the position-determining unit.

20 Claims, 2 Drawing Sheets

(56) References Cited

U.S. PATENT DOCUMENTS

| | | | |
|---|---|---|---|
| 5,210,490 A * | 5/1993 | Munch et al. | 324/207.17 |
| 5,231,352 A * | 7/1993 | Huber | 324/207.24 |
| 5,257,014 A * | 10/1993 | Zimmermann | 340/686.1 |
| 5,323,109 A * | 6/1994 | Mehnert et al. | 324/207.17 |
| 5,619,133 A * | 4/1997 | Shank et al. | 324/207.24 |
| 5,642,043 A * | 6/1997 | Ko et al. | 324/207.24 |
| 5,841,274 A * | 11/1998 | Masreliez et al. | 324/207.17 |
| 5,886,519 A * | 3/1999 | Masreliez et al. | 324/207.17 |
| 5,973,494 A * | 10/1999 | Masreliez et al. | 324/207.24 |
| 6,002,250 A * | 12/1999 | Masreliez et al. | 324/207.16 |
| 6,018,241 A * | 1/2000 | White et al. | 324/207.2 |
| 6,208,497 B1 * | 3/2001 | Seale et al. | 361/160 |
| 6,259,249 B1 * | 7/2001 | Miyata | 324/207.24 |
| 6,332,278 B1 * | 12/2001 | Bezinge et al. | 33/784 |
| 6,573,707 B2 * | 6/2003 | Kiriyama et al. | 324/207.17 |
| 6,597,167 B2 * | 7/2003 | Miyata et al. | 324/207.17 |
| 6,636,035 B2 * | 10/2003 | Sasaki et al. | 324/207.17 |
| 6,942,469 B2 * | 9/2005 | Seale et al. | 417/413.1 |
| 7,044,444 B2 * | 5/2006 | Haubold et al. | 251/279 |
| 7,099,136 B2 * | 8/2006 | Seale et al. | 361/152 |
| 7,449,878 B2 * | 11/2008 | Lee | 324/207.23 |
| 7,538,544 B2 * | 5/2009 | Lee | 324/207.25 |
| 2005/0118983 A1 * | 6/2005 | Van Camp | 455/404.2 |
| 2006/0270394 A1 * | 11/2006 | Chin | 455/418 |
| 2007/0001666 A1 * | 1/2007 | Lee | 324/207.15 |
| 2007/0001668 A1 * | 1/2007 | Mock et al. | 324/207.22 |
| 2008/0134727 A1 * | 6/2008 | May | 68/12.02 |
| 2008/0174302 A1 * | 7/2008 | Lee et al. | 324/207.16 |
| 2009/0243596 A1 * | 10/2009 | Izak et al. | 324/207.16 |
| 2010/0015992 A1 * | 1/2010 | Wakefield | 455/456.1 |
| 2010/0301840 A1 * | 12/2010 | Filatov | 324/207.11 |

FOREIGN PATENT DOCUMENTS

| | | |
|---|---|---|
| DE | 10016540 C1 | 7/2001 |
| EP | 2 072 961 A1 | 6/2009 |
| GB | 1502697 A | 3/1978 |
| GB | 2 454 045 A | 4/2009 |
| KR | 20070068692 A | 7/2007 |
| WO | 9739312 A1 | 10/1997 |
| WO | 2006/082047 A1 | 8/2006 |

OTHER PUBLICATIONS

Ikeda et al., High-precision positioning using a self-sensing piezoelectric actuator control with a differential detection method, Department of Human Environmental Studies, Graduate School of Frontier Science, The University of Tokyo, 2011.*

Cattelain Christophe, "A digital caliper measuring a 2 euros coin", uploaded on Mar. 18, 2006, retrieved on Feb. 9, 2011<URL: http://commons.wikimedia.org/wiki/File:DigitalCapliperEuro.jpg>.

* cited by examiner

DEVICE FOR DETECTING THE POSITION OF AN ACTUATOR

BACKGROUND OF THE INVENTION

Field of the Invention

The present invention relates to a device for detecting the position of an actuator, the device including a conductor arrangement detecting magnetic fluxes passing through it and converting them into a voltage signal which depends on the position at which the magnetic flux enters into the conductor arrangement, and wherein the induced voltage signal is proportional to the position of the magnetic flux, measured along a predetermined axis starting from a predetermined starting point. The present invention further relates and to a method for detecting the position of an actuator that is freely movable relative to the conductor arrangement. The invention further relates to an actuator as claimed.

Such methods and devices are typically used for completing electronic questionnaires. There are various fields of application, as questionnaires, depending on the questions they contain, can be used in different fields. In the medical field, questionnaires may be used to examine patients' personal perception of their condition. Various questionnaires with a quasi-continuous way of questioning, including numerous points on a scale between extreme values, may be distributed to respondents, for example to determine their approval or disapproval of public projects or political parties, etc., and answered by them. The data can then be collected automatically.

In general, there are also various applications for the invention relating to the detection of relative positions, for example in the field of industrial automation.

Common position detection units are prone to complications, as the range of mobility of the actuator, i.e. of the unit whose position is to be detected, is usually limited in relation to and on the surface.

The task of the present invention consists in allowing for as fast and as simple a detection of an actuator's position as possible.

BRIEF SUMMARY OF THE INVENTION

According to the invention, this task is achieved in a device of the above described type by the features as claimed.

The invention provides a device for detecting the position of an actuator, comprising a conductor arrangement detecting magnetic fluxes passing through it and converting them into a voltage signal which depends on the position at which the magnetic flux enters the conductor arrangement, said induced voltage signal being proportional to the position of the magnetic flux, measured along a predetermined axis starting from a predetermined starting point. The invention provides a position determining unit connected to the conductor arrangement and detecting the magnetic flux generated by the actuator and passing through the conductor arrangement and a transmission unit downstream of the position detection unit, by means of which the determined position can be transmitted to a receiver.

Such a device has the advantage that the position of the actuator can be freely chosen and defined, allowing for a better handling of electronic questionnaire systems. It is particularly advantageous that one actuator can be used for a number of different questions which are to be answered.

Another aspect of the present invention provides a reference conductor arrangement which is arranged in a way that it essentially detects the same magnetic flux as the conductor arrangement, a voltage signal which is independent of the actuator's position being present at the output of the reference conductor arrangement, and that the position detection unit determines the ratio, particularly the quotient, of the voltage signal present at the conductor arrangement and the voltage signal present at the reference conductor arrangement and then puts it out and supplies it to the transmission unit.

This improves the precision of detection and compensates the dependence of the value determined for the detected position on the intensity and frequency of the magnetic flux.

It may further be provided that the conductor arrangement comprises a single, particularly wound or meander-shaped, conductor, particularly a wire, the wire being wound more often around those surface areas surrounded by the conductor of the conductor arrangement which are closer to the starting point than surface areas which are further removed from said starting point.

This special design of the invention allows for a particularly simple structure of the conductor arrangement and for a more precise determination of the actuator's position.

It may further be provided that the conductor of the conductor arrangement extends preferably in the same plane as and/or parallel to the axis.

These features, both on their own and in combination, allow for an efficient and simple detection of the actuator's position.

It may also be provided that the reference conductor arrangement is formed including a conductor extending in parallel to the conductor of the conductor arrangement, in which case particularly the surface area surrounded by the wire of the reference conductor arrangement is congruent with the surface area surrounded by the wire of the conductor arrangement.

This structure allows for a particularly efficient compensation of the influence of magnet fluxes of different intensities of different actuators. It also allows for an extensive compensation of the weakening of the flux caused by the discharge of a battery contained in the actuator.

A special aspect of the present invention provides that the conductor arrangement, and optionally also the reference conductor arrangement, is/are arranged in a flat support body, particularly of paper or cardboard, possible positions of the actuator being represented on, particularly printed onto, the support body, for example in the form of a scale.

This allows for the development of an easy-to-use questionnaire. This aspect also represents a particularly advantageous arrangement of the conductor arrangement and the reference conductor arrangement.

A particular embodiment of the device of the invention has an actuator which allows for the impression of a magnetic flux, particularly of an alternating magnetic flux, by the conductor arrangement, preferably also by the reference conductor arrangement, when the conductor arrangement, preferably also the reference conductor arrangement, approaches or contacts the actuator.

This allows for a particularly fast and efficient setting of the values to be detected.

It may also be provided that the actuator has a receiving unit connected to the transmission unit via a data link, particularly via a radio link, the actuator having a display unit displaying the position transmitted by the transmission unit.

This allows for an interaction with the person setting the value to be detected and a simple monitoring of the set values by said person.

It may also be provided that the actuator is formed by a mobile communications device.

This makes various applications possible and facilitates the programming of the actuator for answering particular questionnaires. This way the functionalities of commercially available mobile phones can be used and applied for data acquisition.

Additionally, it may be provided that the actuator is formed as a separate, individual, freely movable component.

This makes it possible to use the actuator for various different questionnaires.

Another task of the present invention consists in the development of an actuator which can be used for different questions of a questionnaire and for different questionnaires.

According to the invention, this aim is achieved by providing an actuator as claimed. Such an actuator may be used for various different questionnaires.

The provided actuator, which is particularly formed by a mobile communications device and comprises a coil to generate a magnetic flux for the purposes of position detection if put against or contacted with a device of the invention and a receiving unit for establishing a data link to a device of the invention.

Advantageously, the actuator has a display unit which can display data received by the receiving unit.

This allows for an interaction with the person setting the value to be detected and a simple monitoring of the set values by said person.

Another task of the invention consists in providing a method for detecting the actuator's position as fast and as easily as possible.

The method of the invention is characterized by the features as claimed.

The invention provides a method for detecting the position of an actuator in relation to a conductor arrangement, said conductor arrangement detecting magnetic fluxes passing through it and converting them into a voltage signal depending on the position where the magnetic flux enters the conductor arrangement, and the actuator and the conductor arrangement being freely movable in relation to one another. According to the invention the actuator is positioned at a position on a predetermined translation axis and generates a magnetic flux passing through the conductor arrangement while being or after having been positioned, the impressed flux being converted into a voltage signal by the conductor arrangement which is present at the conductor arrangement's output, said voltage signal being measured at the conductor arrangement's output and analyzed as a value corresponding to the position or made available for transmission upon request.

Such a method is advantageous as it allows for the free adjustment of the actuator's position and, thus, a better handling of an electronic questionnaire system.

Advantageously, it may be provided that the induced voltage signal present at the output of the reference conductor arrangement, detecting essentially the same magnetic flux as the conductor arrangement, is determined and that the ratio, particularly the quotient, of the voltage signal present at the conductor arrangement and the voltage signal present at the reference conductor arrangement is determined and made available for analyzes and/or transmission.

This allows for a more precise detection and a compensation of the dependence on the intensity and the frequency of the magnetic flux.

It may also be provided that the detected position is transmitted to and displayed by the actuator.

This allows for an interaction with the person setting the value to be detected and a simple monitoring of the set values by said person.

Additionally, it may be provided that a code which is unambiguously assigned to and unambiguously denotes the conductor arrangement is transmitted together with the actuator's position in relation to the conductor arrangement.

This allows for the detection of several values using the same actuator with numerous conductor arrangements.

It may also be provided that the actuator formed as a mobile communications device is radio-connected, particularly via a cellular network, to a data acquisition unit and transmits the subscriber's number, the code and the position to said unit.

This allows for a central automated acquisition of multiple data of different persons using a single questionnaire system.

BRIEF DESCRIPTION OF THE SEVERAL VIEWS OF THE DRAWING

The invention will be further described referring to an exemplary embodiment shown in the FIGS. 1 to 7 without limiting the general scope of the invention.

DESCRIPTION OF THE INVENTION

Figure 1:
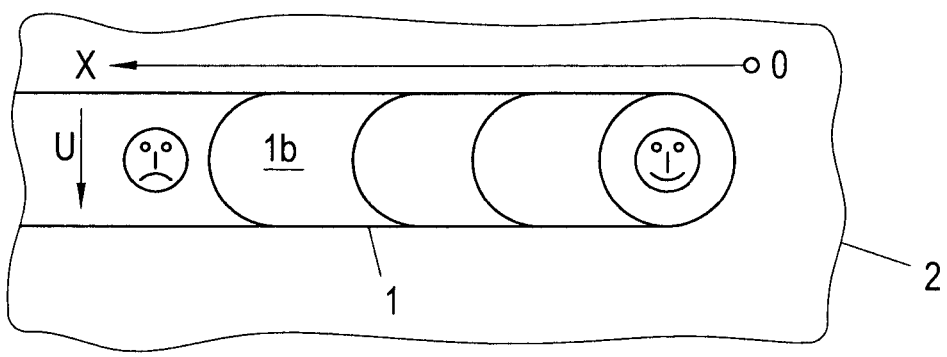
FIG. 1 shows a section of a questionnaire and a conductor arrangement.
Figure 7:
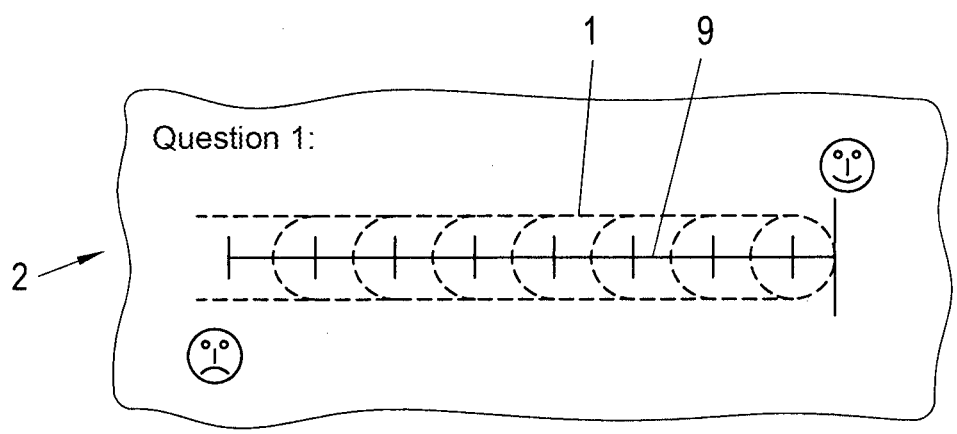
FIG. 7 shows the imprint on a support body and the arrangement of the conductor arrangement.

FIG. 1 shows a section of the surface of a support body 2 in or on which a conductor arrangement 1 is disposed. The conductor arrangement 1 may also be embedded into a flat support body 2. The support body 2 preferably consists of paper or cardboard on which individual positions x are printed or represented, for example in the form of a scale 9 as shown in FIG. 7. Several conductor arrangements 1 can be printed onto or embedded into the support body 2. It is possible to print a question onto the support body 2, for example asking the respondents how they feel, for specific applications. A scale 9 is printed onto the support body 2, and an actuator 4 can be positioned on the scale 9 at a position corresponding to the respondent's condition. At one end of the scale 9 a symbol for a good condition, such as a smiling face, may be represented, while at the other end of the scale 9 a symbol for a bad condition, such as a crying face, may be printed onto the support body (FIGS. 1 and 7). The respondent may then freely choose a value between these two extremes corresponding to how they feel by positioning the actuator 4 in the selected position between the two symbols.

A conductor arrangement 1 detecting magnetic fluxes $\phi$ passing through the support body 2 and converting them into a voltage signal U depending on the position x at which the magnetic flux $\phi$ enters the conductor arrangement 1 is disposed below the scale 9 on or in the support body 2. The magnetic flux $\phi$ induces a voltage signal U in the conductor arrangement 1. This voltage signal U is proportional to the position x of the magnetic flux $\phi$, measured along a predetermined axis X starting from a predetermined starting point 0. The axis X essentially corresponds to the scale 9 printed onto the support body 2; the predetermined starting point 0 essentially corresponds to one of the two extreme values, for example to the position of the symbol showing a crying face. The other extreme value is selected in a way that it is situated at the other end of the axis X of the conductor arrangement 1. As shown in FIG. 1, the conductor arrangement 1 comprises a single wound conductor, which, in the present case, is a wire, the wire being wound more often around surface areas of the conductor arrangement 1 closer to the starting point 0 than around those which are further removed from the starting point. Alternatively, a meander-shaped conductor may be used. The wire is preferably disposed on or printed onto or embedded into the support body 2. Advantageously, the wire is largely parallel to the axis X, only being bent in curves or in a rectangular shape in the areas of the windings, as shown in the figures. The conductor arrangement 1 particularly is a coil with several windings, wherein the surface area around which the conductor is wound can vary.

Figure 4:
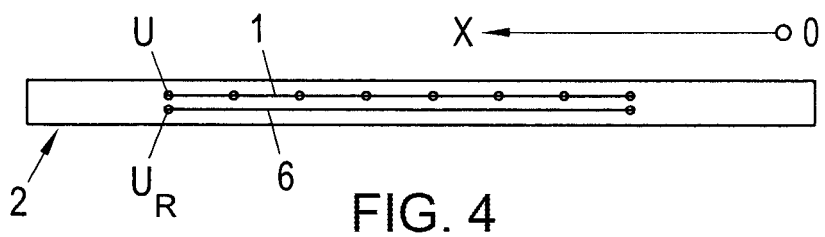
FIG. 4 shows the section of FIG. 3 including a reference conductor arrangement.
Figure 5:
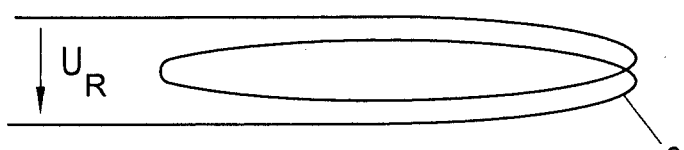
FIG. 5 shows a schematic representation of the reference conductor arrangement.

FIG. 4 shows a cross sectional view of the support body 2, the conductor arrangement 1 being embedded into said support body 2. In addition, a reference conductor arrangement 6 is disposed immediately above or below the conductor arrangement 1 in the support body 2. The reference conductor arrangement 6 is formed by a conductor, the wire of the reference conductor arrangement 6 being wound around a surface area which, at least largely, corresponds to the surface area around which the wire of the conductor arrangement 1 is wound. Advantageously, the parts of the conductor arrangement 1 and the reference conductor arrangement 6 around which the wires are wound are either congruent or largely cover one another. It is particularly advantageous if the overall flux originating from the actuator or at least the greater part of it passes through both the conductor arrangement 1 and the reference conductor arrangement 6. The two conductor arrangements 1, 6 are particularly advantageously arranged in or parallel to a plane and optionally are only spaced apart by a very small distance of a few ten to a few hundred microns. In addition, it may be provided that the two conductor arrangements 1, 6 are convergent or that at least large parts of the surface areas around which the conductors are wound overlap. The reference conductor arrangement does not necessarily have to be disposed immediately below or above the conductor arrangement; it is also possible to dispose the two conductor arrangements 1, 6 in the same plane.

The reference conductor arrangement 6 is disposed and formed in such a way that the flux $\phi$ passing through the surface area surrounded by it is detected independently of the point of entry, an induced voltage signal $U_R$ being present at the output of the reference conductor arrangement 6. The reference conductor arrangement 6 is particularly formed as a coil having several windings wound around the same surface area.

Figure 2:
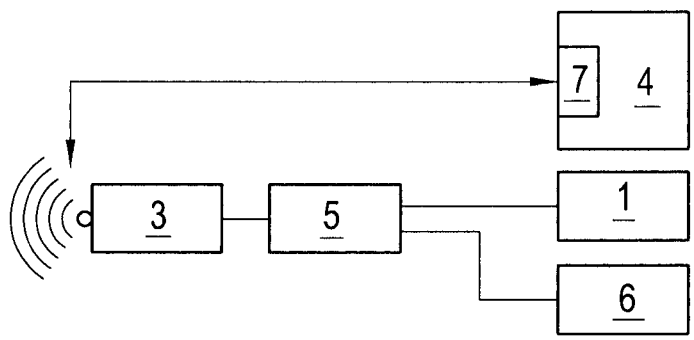
FIG. 2 schematically shows the processing of the induced voltages picked up by the conductor arrangements.
Figure 3:
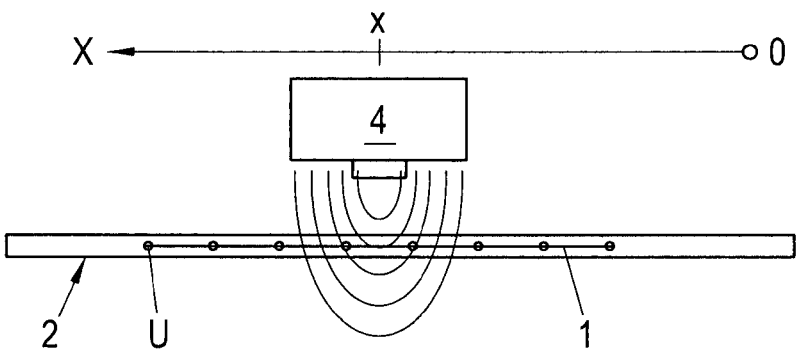
FIG. 3 shows a sectional view of a support body and an actuator.

As shown in FIG. 2, the voltage signals U, $U_R$ present at the conductor arrangement 1 and at the reference conductor arrangement 6, respectively, are supplied to a position detection unit 5. This position detection unit 5 determines the ratio, particularly the quotient, of the voltage signal U present at the output of the conductor arrangement 1 and the voltage signal $U_R$ present at the reference conductor arrangement 6 and then puts it out at its output.

It is, however, not necessarily required to use a reference conductor arrangement 6. It may be provided that only the conductor arrangement 1 is embedded into the flat support body 2 or arranged on or fixed to the surface of the support body 1, while the position detection unit 5 only measures the voltage signal at the output of the conductor arrangement 1 and puts out a corresponding signal at its output.

If an actuator 4 generating a magnetic flux $\phi$ is positioned on the support body 2, the magnetic flux $\phi$ generated by said actuator 4 enters into the conductor arrangement 1, so that a voltage signal U is generated at the output of the conductor arrangement 1. The magnetic flux $\phi$ preferably is an alternating magnetic flux, having a frequency of approximately a few kHz.

The actuator 4 is formed as a separate component which normally is not mechanically connected to the support body 2. Instead it is freely movable in relation to the conductor arrangement 1. The actuator unit 4 is positioned at a position X on the scale 9 or on the predetermined axis X.

During or after the positioning, the actuator 4 generates a magnetic flux $\phi$ passing through the conductor arrangement 1. Due to the structure of the conductor arrangement 1, the detected voltage signal U depends on the position at which the flux $\phi$ is generated, i.e. on the position of the actuator 4. If the actuator 4 is located at a position x on the axis X, the flux $\phi$ generated by the actuator 4 enters into the conductor arrangement 1 at this position x.

If the magnetic flux $\phi$ passes through the surface area around which the wire of the conductor arrangement is wound, a voltage signal U depending on said magnetic flux $\phi$ is induced and output at the output of the conductor arrangement 1. In surface areas 1b around which the wire of the conductor arrangement 1 is wound twice the same magnetic flux $\phi$ induces a voltage signal U having a voltage which is twice as high. In surface areas around which the wire of the conductor arrangement is wound n times, the induced voltage signal U accordingly has a voltage value which is n times higher. As the wire is wound more often around the surface areas closer to the starting point 0 than around the surface areas further removed from the starting point 0, the obtained voltage signal U differs as a function of the position x at which the magnetic flux $\phi$ enters into the conductor arrangement 1 and is proportional to the position x. As the magnetic flux $\phi$ is generated by the actuator 4, the voltage signal U obtained at the output of the conductor arrangement 1 is proportional to the position x of the actuator 4.

While the conductor arrangement 1 generates a signal which depends on the position x of the magnetic flux $\phi$ and, thus, on the position x of the actuator x, the voltage signal $U_R$ generated by the reference conductor arrangement 6 is independent of the position x of the actuator 4 and just depends on the intensity and the frequency of the magnetic flux $\phi$ generated by the actuator 4.

Due to the use of different or differently configured actuators 4 as well as due to a reduced battery voltage during the operation of the actuator 4, the magnetic fluxes $\phi$ may vary, leading to different results in spite of using the same conductor arrangement 1 and positioning the actuator 4 at the same position. If the actuator 4 or different actuators 4 generate different magnetic fluxes $\phi$ and only the voltage signal U at the output of the conductor arrangement 1 is measured, it is impossible to determine whether a change in voltage is due to a change in position of the actuator 4 or to change in the magnetic flux $\phi$ and/or to a change in the frequency of the magnetic flux $\phi$.

If the magnetic flux $\phi$ becomes weaker or the frequency of the alternating magnetic flux generated by the actuator 4 is reduced, the voltage signal $U_R$ at the output of the reference conductor arrangement 6 is reduced to the same extent.

A non-dimensional value which is not influenced by the specific characteristics of the magnetic flux $\phi$ is determined by the division of the value of the voltage signal U at the output of the conductor arrangement 1 by the value of the voltage signal $U_R$ at the output of the reference conductor arrangement 6.

At the output of the position detection unit 5, a signal corresponding to the quotient $U/U_R$ is output. The signal is transmitted to a transmission unit 3 which is arranged downstream of the position detection unit 5. In the present case, the transmission unit 3 is a radio transmission unit, as shown in FIG. 2, which can be connected to the actuator 4 or any other receiver via a radio link. The transmission unit 3 transmits the positions x via a data link, particularly via a radio link, to a downstream receiver.

Figure 6:
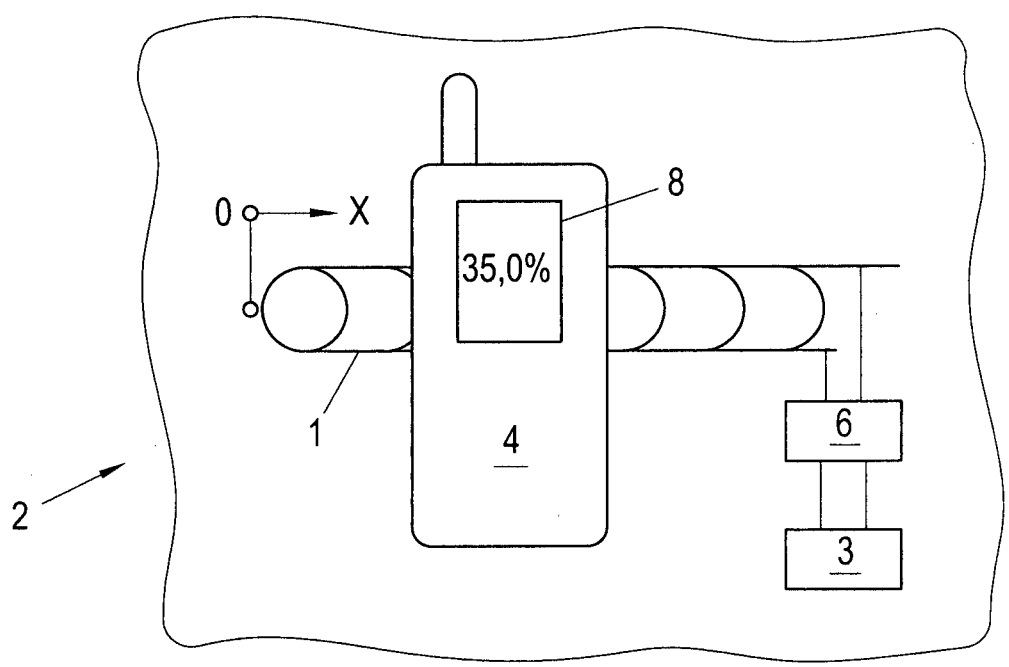
FIG. 6 shows the section shown in FIG. 1 including an actuator.

A particularly advantageous application of the invention becomes possible, if the transmission unit 3 is connected to the actuator 4 via a data link and if the actuator 4 has a display unit 8 displaying the position x transmitted by the transmission unit 3, as shown in FIG. 6. This has the advantage of enabling the user of the device to read the value selected by positioning the actuator 4 while positioning it. This way, mistakes in positioning the actuator 4 can be avoided. Particularly a mobile communications device, including means for impressing a magnetic flux φ, can be used as an actuator 4. Particularly interfaces existing in mobile communications devices which are commonly used for data transfer, such as a radio link via bluetooth, may be used to this end.

Depending on the frequency of the magnetic flux to be generated, an antenna or an electromagnet can, for example, be used to generate the magnetic flux φ; it is possible to use both constant magnetic fields and alternating magnetic fields or fluxes. If an alternating magnetic flux is selected, it may be selected almost at will from a broad range of frequencies, the position of the actuator 4 being determined based on the induced voltage signal U. For NFC applications, magnetic fields of approximately 13.56 MHz are provided. It is advantageous to use magnetic fields of up to a few hundred MHz.

In addition, an application which collects and saves all the acquired data or transmits them to a central server may be run on the mobile communications device.

An actuator 4 of the invention is particularly formed by a mobile communications device which has a coil for generating a magnetic flux φ. This magnetic flux φ is used for detecting positions if the actuator is connected to a device of the invention.

The mobile communications device further comprises a receiving unit 7 to establish a data link to the transmission unit 3.

The actuator 4 of the invention further has a display unit 8 displaying the data received by the receiving unit 7. The determined data may optionally also be further transmitted to a central data acquisition unit via the actuator 4 in the form of a mobile communications device. The selected value can be assigned to the respective question and to the respective respondent both via the mobile communications device and via a code identifying the respective transmission unit 3 by which it is transmitted in addition to the data. The code from the transmission unit, optionally in combination with the number identifying the mobile communications device (subscriber's number) and the selected value, is then transmitted to and stored by the data acquisition unit, which is connected to the mobile communications device via a data link.

The invention claimed is:

1. A positing-detecting assembly, the assembly comprising:
    a conductor arrangement detecting magnetic fluxes passing therethrough and converting the fluxes into a voltage signal that depends on a position at which the magnetic flux enters into said conductor arrangement;
    wherein an induced voltage signal is proportional to the position of the magnetic flux, measured along a predetermined axis starting from a predetermined starting point;
    an actuator configured for impressing a magnetic flux passing through said conductor arrangement when coming close to, or in contact with, said conductor arrangement;
    said actuator being a mobile communications device connected to a data acquisition unit via a radio link in a cellular network, and said actuator transmitting a subscriber's number, a code, and a position relative to the data acquisition unit;
    a position determining unit connected to said conductor arrangement and configured to determine the position of a magnetic flux generated by said actuator and passing through said conductor arrangement; and
    a transmission unit connected to said position determining unit and configured for transmitting the determined position to a receiver;
    said actuator having a receiving unit connected to said transmission unit via a data link and a display unit configured for displaying the position transmitted by said transmission unit.

2. The assembly according to claim 1, wherein said actuator is configured to impress an alternating magnetic flux through said conductor arrangement.

3. The assembly according to claim 1, wherein said data link is a radio link connecting said transmission unit and said receiving unit.

4. The assembly according to claim 1, which comprises:
    a reference conductor arrangement disposed to detect a substantially equal magnetic flux as said conductor arrangement, said reference conductor arrangement having an output carrying a voltage signal that is independent of the position of said actuator; and
    wherein said position determining unit determines and outputs a ratio between the voltage signal present at said conductor arrangement and the voltage signal present at said reference conductor arrangement and transmits the ratio to said transmission unit.

5. The assembly according to claim 4, wherein said actuator is configured to impress the magnetic flux through said reference conductor arrangement when coming close to or contacting said reference conductor arrangement.

6. The assembly according to claim 1, wherein said conductor arrangement comprises a single conductor, and
    surface areas wound by said conductor of said conductor arrangement closer to the starting point are more often wound by said conductor than surface areas farther removed from the starting point; and
    said conductor of the conductor arrangement extends in a common plane with, or parallel to, the axis.

7. The assembly according to claim 6, wherein said conductor arrangement comprises a wound or meander-shaped wire conductor.

8. The assembly according to claim 4, wherein said reference conductor arrangement is formed by a conductor that is parallel to said conductor of said conductor arrangement, and wherein a surface area around which a wire of said reference conductor arrangement is wound is congruent with a surface area around which a wire of said conductor arrangement is wound.

9. The assembly according to claim 4, wherein said conductor arrangement and said reference conductor arrangement are arranged in a flat support body and possible positions of said actuator are indicated on said support body.

10. The assembly according to claim 9, wherein said support body is paper or cardboard and the possible positions of said actuator are indicated in the form of a scale.

11. The assembly according to claim 1, wherein said conductor arrangement is arranged in a flat support body and possible positions of said actuator are indicated on said support body.

12. The assembly according to claim 11, wherein said support body is paper or cardboard and the possible positions of said actuator are indicated in the form of a scale.

13. The assembly according to claim 1, wherein said actuator is a mobile communications device.

14. The assembly according to claim 1, wherein said actuator is a separate, individual, freely movable component.

15. The assembly according to claim 1, wherein said actuator is a mobile communications device, comprising a coil for generating a magnetic flux for position detection, when being placed against said conductor arrangement.

16. The assembly according to claim 1, wherein said actuator is a mobile communications device, comprising a coil for generating a magnetic flux for position detection, when being placed against said conductor arrangement, and a display unit capable of displaying the data received by said receiving unit.

17. A method for detecting the position of an actuator in relation to a conductor arrangement, the method comprising:
providing the conductor arrangement to detect magnetic fluxes passing therethrough and to convert the magnetic fluxes into a voltage signal that depends on the position at which the magnetic flux enters the conductor arrangement; and
wherein the actuator is a mobile communications device connected to a data acquisition unit via a radio link in a cellular network, wherein the actuator and the conductor arrangement are freely movable relative to one another, and wherein the actuator transmits a subscriber's number, a code, and a position relative to a data acquisition unit;
positioning the actuator at a position on a predetermined translation axis and generating a magnetic flux, which passes through the conductor arrangement during or after positioning;
converting an impressed flux into a voltage signal by the conductor arrangement and outputting the voltage signal at an output of the conductor arrangement; and
measuring the voltage signal at the output of the conductor arrangement and evaluating as a value corresponding to the position or keeping the voltage signal available for transmission upon request; and
transmitting the detected position and displaying the detected position on the actuator.

18. The method according to claim 17, which comprises:
determining an induced voltage signal at an output of a reference conductor arrangement disposed to detect substantially the same magnetic flux as the conductor arrangement; and
determining a ratio between the voltage signal present at the conductor arrangement and the voltage signal present at the reference conductor arrangement and keeping the ratio available for analysis and/or transmission.

19. The method according to claim 18, wherein the determining step comprises determining a quotient between the voltage signal present at the conductor arrangement and the voltage signal present at the reference conductor arrangement.

20. The method according to claim 17, which comprises transmitting a code, unambiguously assigned to and unambiguously denoting the conductor arrangement, together with the position of the actuator in relation to the conductor arrangement.

* * * * *